(12) United States Patent
Min

(10) Patent No.: US 8,032,616 B2
(45) Date of Patent: Oct. 4, 2011

(54) METHOD OF ALLOCATING IP ADDRESS OF IMAGE FORMING APPARATUS USING DHCP, IMAGE FORMING APPARATUS AND SYSTEM OF ALLOCATING IP ADDRESS USING DHCP

(75) Inventor: Ju-won Min, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 236 days.

(21) Appl. No.: 12/544,397

(22) Filed: Aug. 20, 2009

(65) Prior Publication Data

US 2010/0082779 A1   Apr. 1, 2010

(51) Int. Cl.
*G06F 15/177* (2006.01)
*G06F 15/173* (2006.01)
(52) U.S. Cl. ........................ 709/220; 709/223
(58) Field of Classification Search .................. 709/220, 709/223
See application file for complete search history.

(56) References Cited

U.S. PATENT DOCUMENTS

| | | | | |
|---|---|---|---|---|
| 7,124,201 B2 * | 10/2006 | Iyoki | | 709/245 |
| 7,158,783 B2 * | 1/2007 | Eguchi | | 455/420 |
| 7,370,093 B2 * | 5/2008 | Ohara | | 709/220 |
| 7,398,428 B2 * | 7/2008 | Hille | | 714/44 |
| 7,747,779 B2 * | 6/2010 | Nishio | | 709/245 |
| 7,752,345 B2 * | 7/2010 | Duckett | | 710/8 |
| 7,774,477 B2 * | 8/2010 | Zintel et al. | | 709/227 |
| 7,788,355 B2 * | 8/2010 | Maeda | | 709/223 |
| 7,925,705 B2 * | 4/2011 | Ishimoto et al. | | 709/206 |

* cited by examiner

*Primary Examiner* — Hussein Elchanti
(74) *Attorney, Agent, or Firm* — Stanzione & Kim, LLP

(57) ABSTRACT

A method of allocating an IP address of an image forming apparatus using Dynamic Host Configuration Protocol (DHCP), and an image forming apparatus and system performing the method, the method including requesting a DHCP server to allocate an IP address to an image forming apparatus having a previously allocated IP address in response to the image forming apparatus being re-connected to a network, responding to the IP address allocation request by the DHCP server, declining to respond to the response of the DHCP server, and providing the previously allocated IP address to the image forming apparatus upon receiving no response from the image forming apparatus after a predetermined time.

21 Claims, 6 Drawing Sheets

METHOD OF ALLOCATING IP ADDRESS OF IMAGE FORMING APPARATUS USING DHCP, IMAGE FORMING APPARATUS AND SYSTEM OF ALLOCATING IP ADDRESS USING DHCP

CROSS-REFERENCE TO RELATED APPLICATIONS

This application claims the benefit under 35 U.S.C. §119 (a) of Korean Patent Application No. 10-2008-0096213, filed on Sep. 30, 2008, in the Korean Intellectual Property Office, the disclosure of which is incorporated herein in its entirety by reference.

BACKGROUND

1. Field of the Invention

The present general inventive concept relates to allocation of an Internet protocol (IP) address, and, more particularly, to a method of allocating an IP address of an image forming apparatus using the Dynamic Host Configuration Protocol (DHCP), an image forming apparatus to which an IP address is allocated using DHCP, and a system of allocating an IP address using DHCP.

2. Description of the Related Art

In general, a Dynamic Host Configuration Protocol (DHCP) server has a function of transmitting configuration parameters to a plurality of hosts using Transmission Control Protocol/Internet Protocol (TCP/IP). The DHCP allows a client to receive dynamic or static IP configuration information from the DHCP server when booted so that there is no need for a network manager to configure a network for each host, and allocates a number of IP addresses, which is smaller than the number of actually existing clients, so that a limited number of IP addresses can be efficiently used.

In the case of dynamic allocation of an IP address, when a configuration information request is received from a client, the network manager selects an IP address that is not currently allocated to any client from a predetermined range of predetermined IP addresses (for example, 100.1.1.1 through 100.1.1.254) and allocates the selected IP address to the client. Here, the DHCP server does not grant the client a right to use the IP address unlimitedly, but gives the client a right to use the IP address only for a predetermined period previously set by the network manager.

In the case of static allocation of an IP address, when a configuration information request is received from a client, the DHCP server confirms whether the hardware address of the client is included in a table constructed of pairs of IP addresses previously designated by the network manager and hardware addresses and allows the client to use IP configuration information unlimitedly only when the table includes the hardware address of the client.

When a network printing device, constituting a DHCP client, is turned off/on, the network printing device operates and requests the DHCP server to allocate an IP address thereto. In this situation, the DHCP server allocates an IP address other than the IP address previously allocated to the DHCP client to the DHCP client. This affects an IP address based network printing service. That is, even if a user simply turns off/on the network printing device, IP address configuration is changed and thus the user cannot use a desired service or has to reconfigure the IP address of the network printing device.

SUMMARY

The present general inventive concept provides a method of allocating an IP address of an image forming apparatus using Dynamic Host Configuration Protocol (DHCP) to allocate a previously allocated IP address without changing the IP address in response to a DHCP server allocating a new IP address.

The present general inventive concept also provides an image forming apparatus allocated an IP address using DHCP.

The present general inventive concept also provides an IP address allocation system in which the image forming apparatus operates as a DHCP client.

Additional aspects and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of allocating an IP address of an image forming apparatus using DHCP, which includes requesting a DHCP server to allocate an IP address to an image forming apparatus having a previously allocated IP address wherein the requesting is performed by the image forming apparatus, in response to the image forming apparatus being re-connected to a network; responding to the IP address allocation request wherein the responding is performed by the DHCP server; declining to respond to the response of the DHCP server wherein the declining is performed by the image forming apparatus; and providing the previously allocated IP address to the image forming apparatus wherein the providing is performed by the DHCP server, upon receiving no response from the image forming apparatus after a predetermined time.

The foregoing and/or other features and utilities of the present general inventive concept may also be achieved by providing an image forming apparatus including a storage unit to store an IP address previously allocated by a DHCP server, a network interface to transmit/receive packets to/from the DHCP server used in IP address allocation through a network and a controller to request the DHCP server to allocate an IP address through the network interface in response to the image forming apparatus being re-connected to the network, receive a packet to confirm whether the image forming apparatus is connected to the network from the DHCP server through the network interface, decline to respond to the received packet, receive the previously allocated IP address transmitted from the DHCP server through the network interface and store the received IP address in the storage unit.

The foregoing and/or other features and utilities of the present general inventive concept may also be achieved by providing an IP allocation system using DHCP, which includes an image forming apparatus to operate as a DHCP client, a network managed by at least one DHCP server wherein the at least one DHCP server allocates an IP address to at least one DHCP client including the image forming apparatus through the network using DHCP. The image forming apparatus may include a storage unit to store an IP address previously allocated by the DHCP server, a network interface to transmit/receive packets to/from the DHCP server used in IP allocation through a network and a controller to request the DHCP server to allocate an IP address through the network interface in response to the image forming apparatus being re-connected to the network, receive a packet to confirm whether the image forming apparatus is connected to the network from the DHCP server through the network interface, decline to respond to the received packet, receive the previously allocated IP address transmitted from the DHCP server through the network interface and store the received IP address in the storage unit. The DHCP server may include a server storage unit to store a range of IP addresses to be allocated to DHCP clients and a lease list including IP addresses that have been allocated to the DHCP clients and MAC addresses of the DHCP clients, which correspond to the IP addresses, a server network interface to transmit/receive packets to/from the DHCP clients used in IP allocation through the network and a controller to receive the IP address allocation request from the image forming apparatus through the server network interface, transmit the packet to confirm whether the image forming apparatus is connected to the network to the image forming apparatus, read the previously allocated IP address of the image forming apparatus from the server storage unit upon receiving no response from the image forming apparatus to the confirmation packet after a predetermined time and transmit the read previously allocated IP address to the image forming apparatus.

The foregoing and/or other features and utilities of the present general inventive concept may also be achieved by providing a method of allocating an IP address using DHCP, the method including sending an IP address allocation request from a device to a DHCP server, sending a confirmation request from the DHCP server to the device, and providing a previously allocated IP address to the device by the DHCP server in response to not receiving a response to the confirmation request from the device.

The foregoing and/or other features and utilities of the present general inventive concept may also be achieved by providing a device to be allocated an IP address, including a request circuit to request an IP address allocation from a server, and a response control circuit to determine whether to respond to a confirmation request from the server, wherein the response control circuit selectively declines to respond to the confirmation request in order to be allocated a previously allocated IP address.

The foregoing and/or other features and utilities of the present general inventive concept may also be achieved by providing a device to allocate an IP address, including a transmission circuit to transmit a confirmation request to a client in response to receiving an IP address allocation request from the client, and an allocation circuit to allocate a previously allocated IP address to the client upon receiving no response from the client after a predetermined time.

The foregoing and/or other features and utilities of the present general inventive concept may also be achieved by providing an input circuit to select whether to obtain a new IP address or a previously allocated IP address after being reconnected to a network, and a response control circuit to decline responding to a confirmation request from a server in response to a selection to obtain the previously allocated IP address.

BRIEF DESCRIPTION OF THE DRAWINGS

These and/or other features and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
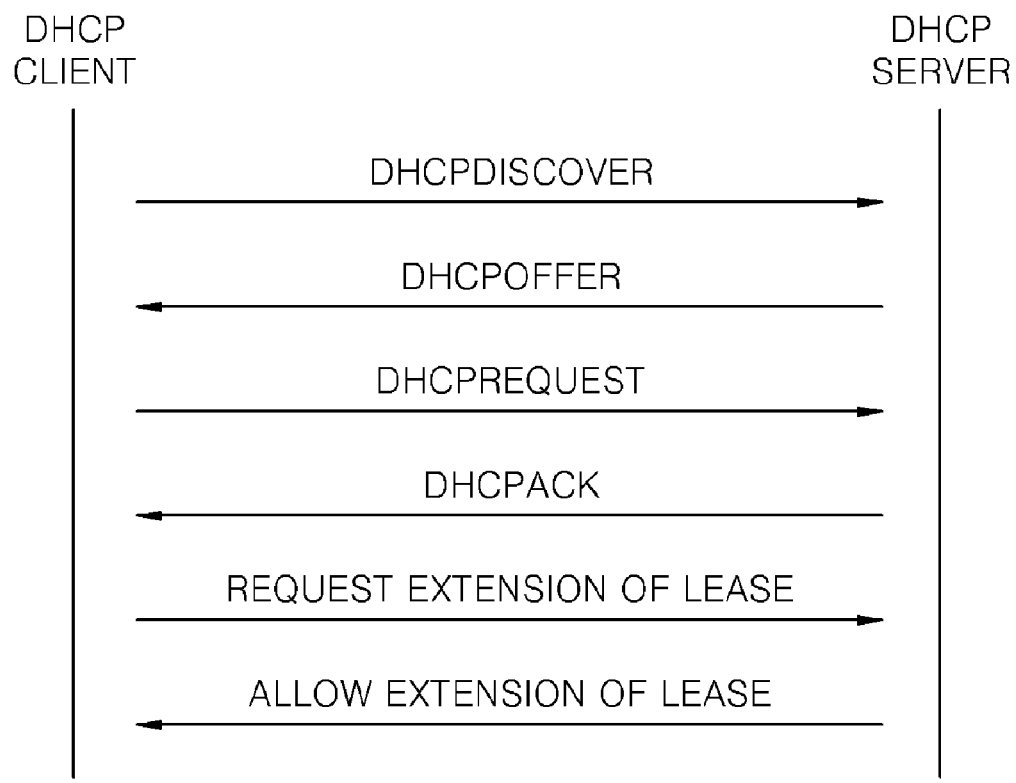
FIG. 1 illustrates standard procedures (RFC2131) of a Dynamic Host Configuration Protocol (DHCP) IP address allocating method.

Reference will now be made in detail to various exemplary embodiments of the present general inventive concept, examples of which are illustrated in the accompanying drawings, wherein like reference numerals refer to the like elements throughout. The embodiments are described below in order to explain the present general inventive concept by referring to the figures.

In general, a Dynamic Host Configuration Protocol (DHCP) IP allocating method may be performed according to standard procedures (RFC2131) illustrated in FIG. 1. Referring to FIG. 1, when a DHCP client transmits a DHCPDISCOVER broadcast packet, a DHCP server may receive the DHCPDISCOVER broadcast packet and transmit a DHCPOFFER to the DHCP client to provide an IP address usable by the DHCP client. Subsequently, the DHCP client may receive the DHCPOFFER and transmit a DHCPREQUEST that requests the DHCP server to lease the IP address provided by the DHCP server. The DHCP server may receive the DHCPREQUEST and transmit a DHCPACK to the DHCP client to officially grant the DHCP client the lease of the IP address. When the DHCP client requests the DHCP server to extend the lease before the lease expires, the DHCP server may transmit an acknowledgement and grant the lease of the IP address to be extended to the DHCP client.

The transmission of the DHCPOFFER from the DHCP server to the DHCP client will now be explained in more detail with reference to FIG. 1. According to the present general inventive concept, the DHCP server may perform a "selecting" operation to select the IP address to be allocated to the DHCP client. While performing such a procedure, the DHCP server may confirm whether the DHCP client responds using information regarding the client that was previously allocated an IP address, which is stored in the DHCP server.

In this operation, the DHCP server may confirm whether the client sends a response using an ARP broadcast, Internet Control Message Protocol (ICMP), or PING.

However, the conventional DHCP server typically merely confirms the range of IP addresses that can be allocated to the DHCP client in the DHCPOFFER operation and allocates an IP address other than the previously allocated IP address to the DHCP client, and thus the IP address of the DHCP client is changed.

Although the DHCP server operates based on a vendor specification of the DHCP server, which is included in necessary operations of the standard procedures (RFC2131), in this conventional case, the IP address of the DHCP client is typically changed when the DHCP client wants to be re-allocated the IP address thereof due to disconnection from the DHCP server.

Furthermore, the conventional DHCP server included in a wired/wireless small IP sharer or a wireless sharer may perform an operation of changing an IP address as described above.

Figure 2:
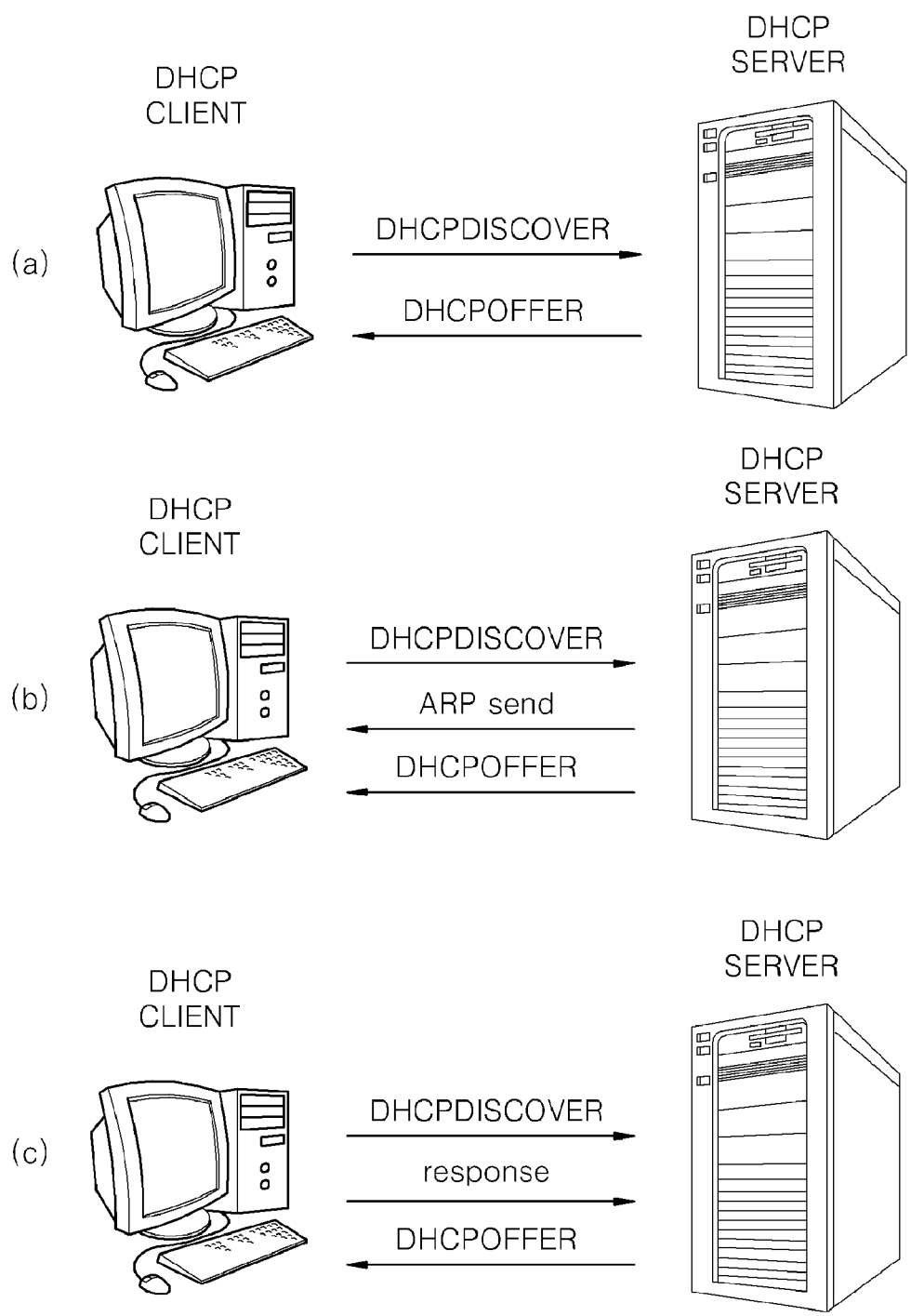
FIG. 2(a) illustrates a normal operation performed between a DHCP client and a DHCP server in a DHCP discover procedure.
FIG. 2(b) illustrates an operation in which the DHCP server confirms the DHCP client through Address Resolution Protocol (ARP) packet transmission corresponding to non-standard procedures.
FIG. 2(c) illustrates a response of the DHCP client to a confirmation operation of the DHCP server.

FIG. 2(a) illustrates a typical operation in which the conventional DHCP server transmits the DHCPOFFER including an IP address to be allocated to the DHCP client to the DHCP client in response to the DHCP client transmitting the DHCODISCOVER broadcast packet to the DHCP server. Referring to FIG. 2(b), the DHCP server may perform the selecting operation to confirm an IP address allocatable to the DHCP client. That is, the DHCP server may send the ARP packet to determine whether the DHCP client exists. In this situation, the DHCP client may transmit a response to the ARP packet, as illustrated in FIG. 2(c), and the DHCP server may allocate a new IP address to the DHCP client. That is, the DHCP server does not transmit the IP address previously allocated to the DHCP client, but selects a new IP address from the range of IP addresses and transmits the selected IP address to the DHCP client through the DHCPOFFER. Accordingly, the IP address of the DHCP client is changed.

To prevent the IP address of the DHCP client from being changed, or from being assigned a different IP address than previously allocated, the present general inventive concept may decline, in other words refuse, to respond to the ARP packet before the DHCPOFFER operation.

Figure 3:
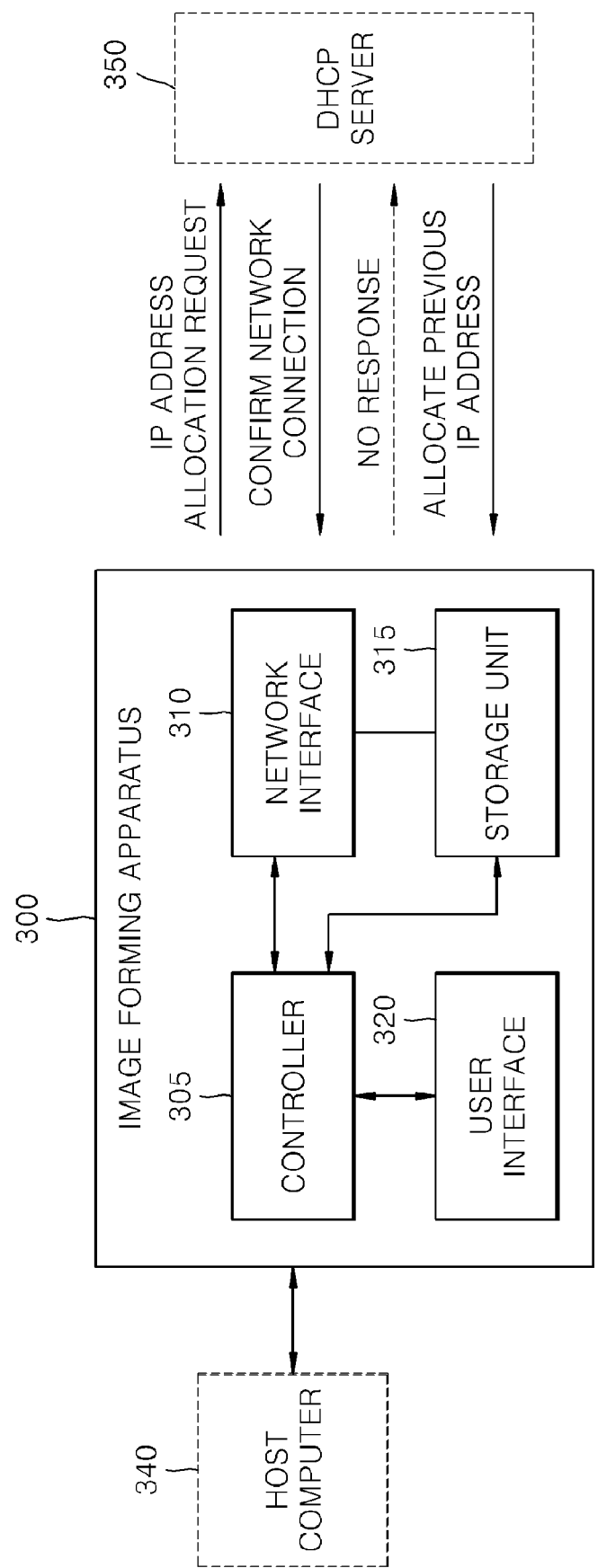
FIG. 3 is a block diagram illustrating a configuration of an image forming apparatus allocated an IP address using DHCP, according to an embodiment of the present general inventive concept.

FIG. 3 is a block diagram illustrating a configuration of an image forming apparatus 300 allocated an IP address using DHCP, according to an embodiment of the present inventive concept. Referring to FIG. 3, the image forming apparatus 300 according to the present embodiment may include a controller 305, a network interface 310 and a storage unit 315. The image forming apparatus 300 may further include a user interface 320.

The storage unit 315 may store an IP address previously allocated by a DHCP server 350. The network interface 310 may transmit/receive packets to/from the DHCP server 350 through a network to achieve IP address allocation.

The controller 305 may request the DHCP server 350 to allocate an IP address through the network interface 310 in response to the image forming apparatus 300 being re-connected to the network. When the DHCP server 350 transmits a packet to confirm whether the image forming apparatus 300 is connected to the network to the image forming apparatus 300, the controller 305 may receive the packet through the network interface 310 and may refuse to respond to the received confirmation packet. In the situation in which the controller 305 controls the image forming apparatus 300 so as not to respond to the received confirmation packet, the DHCP server 350 may transmit an IP address that was previously allocated to the image forming apparatus 300 based on information included in the IP address allocation request already received from the image forming apparatus 300. The DHCP server 350 may transmit this previously allocated IP address to the image forming apparatus 300 after not receiving a response to the confirmation packet after a predetermined length of time. When the previously allocated IP address is transmitted from the DHCP server 350, the controller 305 may receive the previously allocated IP address through the network interface 310 and may store the received IP address in the storage unit 315. The network re-connection can be achieved in response to the image forming apparatus 300 being turned off and on and the network being disconnected and re-connected between the image forming apparatus 300 and the DHCP server 350. It may be confirmed that the image forming apparatus 300 is connected to the network using an ARP Broadcast, ICMP, PING, etc.

Figure 4:
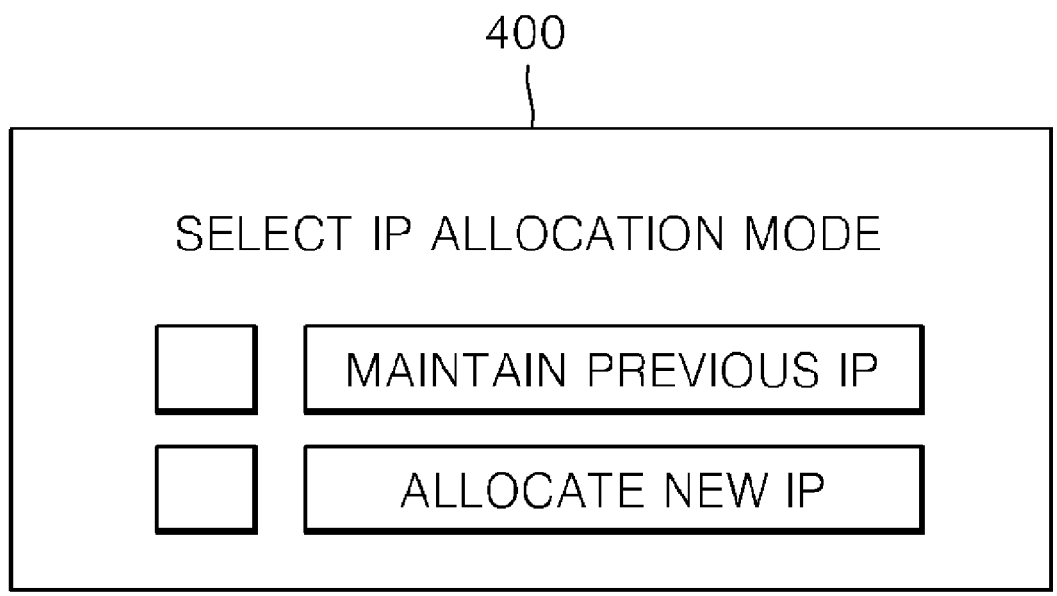
FIG. 4 illustrates an exemplary allocation mode selecting window used to select a user allocation mode provided by a user interface.

The user interface 320 may provide an IP allocation mode of selecting whether the previously allocated IP is maintained in the IP allocation process using the DHCP server 350 to a user. FIG. 4 illustrates an exemplary allocation mode selecting window used to select the IP allocation mode provided by the user interface 320. The IP allocation mode may include a new IP allocation mode used to reply to a response of the DHCP server 350 to be allocated a new IP address and a previous IP maintenance mode used to make no reply to the response of the DHCP server 350 to maintain a previously allocated IP address. The allocation mode selecting window 400 of FIG. 4 is one example configuration used to present such alternative IP address allocation modes of operation to the user.

The image forming apparatus 300 may receive the previously allocated IP address provided by the DHCP server 350 and store the received IP address in the storage unit 315 as a new IP address. The image forming apparatus 300 can receive a response transmitted from the DHCP server 350 and display the received response to the user. It may be preferable to display the response through a panel of the image forming apparatus 300 or a user interface of a host computer 340 connected to the image forming apparatus 300.

Figure 5:
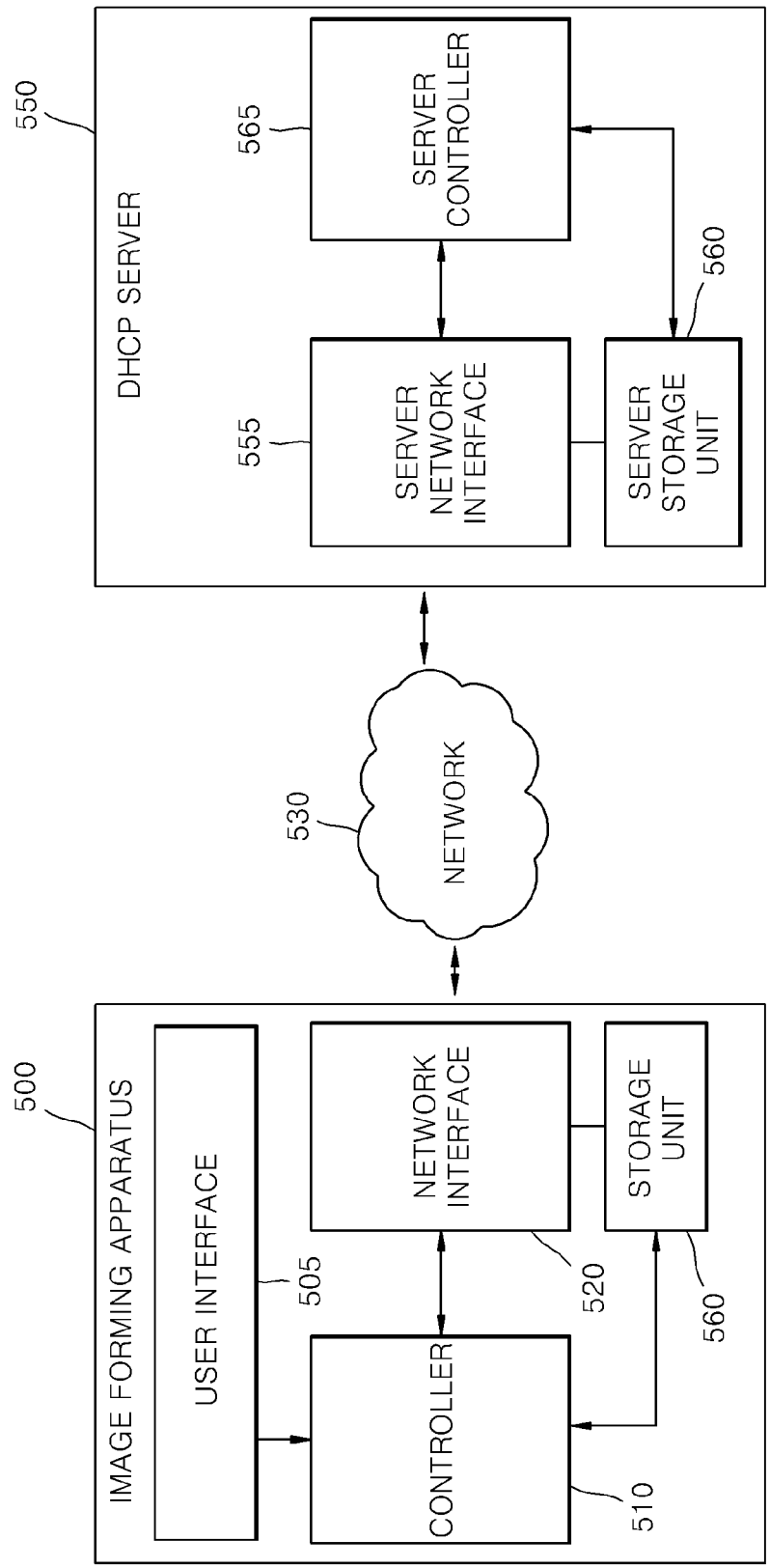
FIG. 5 is a schematic diagram illustrating an IP allocation system using DHCP, according to an embodiment of the present general inventive concept.

FIG. 5 is a schematic diagram illustrating an IP allocation system using DHCP, according to an embodiment of the present general inventive concept. Referring to FIG. 5, the IP allocation system according to the present embodiment may include an image forming apparatus 500, a network 530 and at least one DHCP server 550.

The image forming apparatus 500 may operate as a DHCP client, and may include a user interface 505, a controller 510, a network interface 520, and a storage unit 560. The image forming apparatus 500 may be substantially similar to the image forming apparatus 300 illustrated in FIG. 3, and thus a detailed explanation thereof is not repeated.

The network 530 may be managed by the at least one DHCP server 550.

The DHCP server 550 may allocate an IP address to at least one DHCP client including the image forming apparatus 500 through the network 530 using DHCP.

The DHCP server 550 may include a server storage unit 560, a server network interface 555 and a server controller 565. The server storage unit 560 may store a range of IP addresses to be allocated to DHCP clients and a lease list including IP addresses that were previously allocated to the DHCP clients and MAC addresses of the DHCP clients.

The server network interface 555 may transmit/receive packets to/from the image forming apparatus 500 in order to allocate an IP address to the image forming apparatus 500 through the network 530.

The server controller 565 may receive an IP address allocation request transmitted from the image forming apparatus 500 through the server network interface 555 and may transmit a packet used to confirm whether the image forming apparatus 500 is connected to the network 530 through the server network interface 555. Upon receiving no response to the confirmation packet from the image forming apparatus 500 after a predetermined time, the server controller 565 may read an IP address previously allocated to the image forming apparatus 500 from the server storage unit 560 and may transmit the read IP address to the image forming apparatus 500. In this embodiment, the predetermined time may correspond to a timeout period and can be set to a value in a range of about 30 seconds to about 5 minutes according to a network environment.

The DHCP server 550 may attempt to confirm whether the image forming apparatus 500 is connected to the network 530 using an ARP Broadcast, ICMP, PING, etc.

Figure 6:
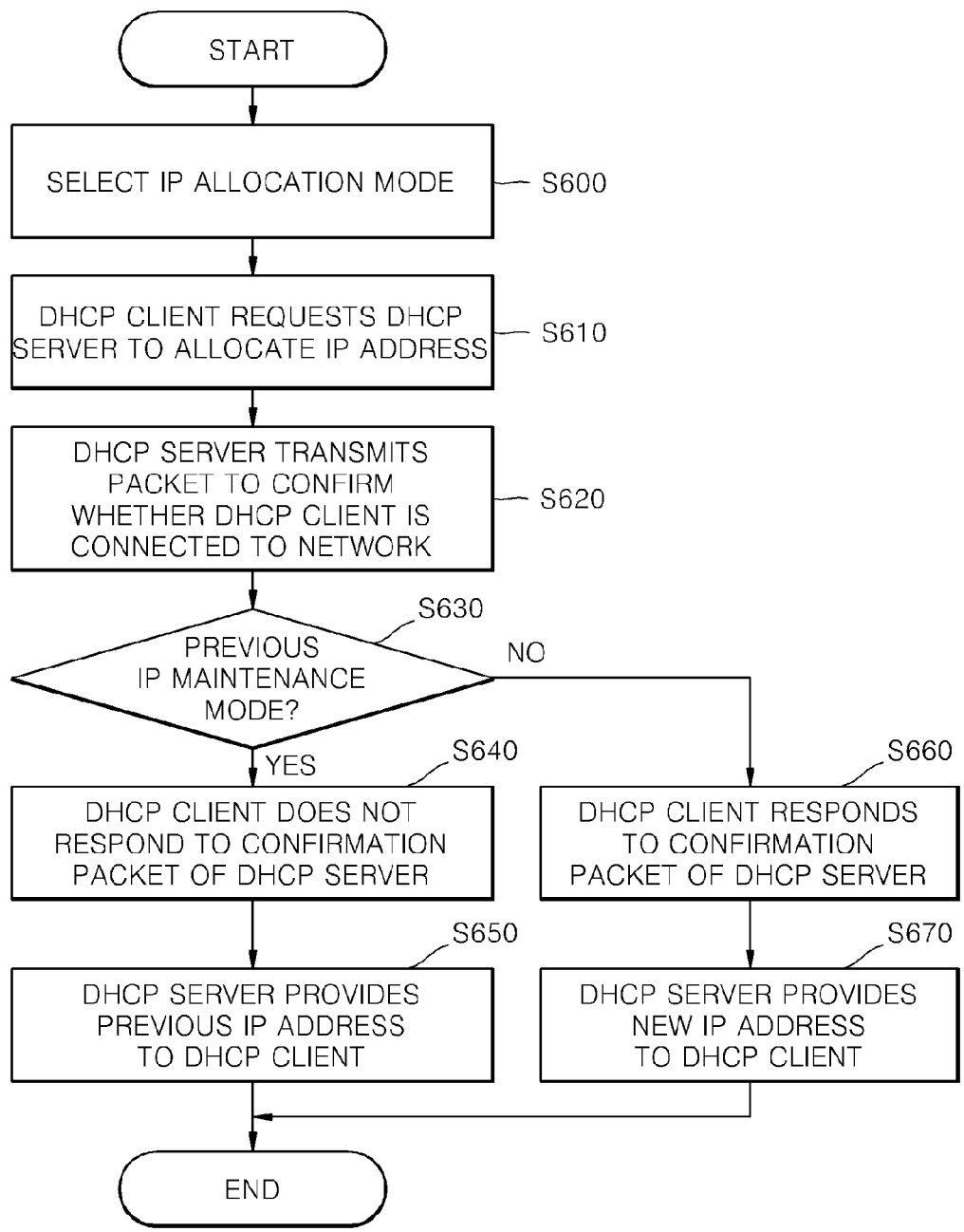
FIG. 6 is a flowchart illustrating a method of allocating an IP address to a DHCP client, according to an embodiment of the present general inventive concept.

FIG. 6 is a flowchart illustrating a method of allocating an IP address to an image forming apparatus using DHCP, according to an embodiment of the present general inventive concept. The method of allocating an IP address to an image forming apparatus using DHCP will now be explained with reference to FIGS. 5 and 6.

The image forming apparatus, which may be a network printer device constituting a DHCP client, may be connected to the network 530 connected to the DHCP server 550. Of course, the DHCP client is not restricted to such a network printer device, but also may be any device allocated an IP address by the DHCP server 550 using DHCP.

The image forming apparatus 500 may be allocated an IP address by the DHCP server 550 so that a user or a printer manager may register a network service using the allocated IP address through the network 530.

In a situation such as when the image forming apparatus 500 is turned off and on, and thus the image forming apparatus 500 is disconnected from the network 530 and then re-connected to the network 530 and re-allocation of an IP address is required, the image forming apparatus 500 may select an IP allocation mode through the user interface 505 in operation S600. An exemplary user interface image which may be used to select the IP allocation mode is illustrated in FIG. 4.

The image forming apparatus 500 may transmit a DHCPDISCOVER packet to the DHCP server 550 to request the DHCP server 550 to re-allocate an IP address thereto in operation S610.

The DHCP server 550 may respond to the DHCPDISCOVER packet received from the network printer device 500. That is, the DHCP server 550 may perform a selecting operation to determine the IP address to be allocated to the image forming apparatus 500. Specifically, the DHCP server 550 may transmit a packet to confirm whether the image forming apparatus 500 is connected to the network 530 in order to select the IP address to be allocated to the image forming apparatus 500 in operation S620. This packet may be transmitted using an ICMP, PING, ARP, etc., and the DHCP server 550 may attempt to confirm a response of the image forming apparatus 500 to the packet.

When the image forming apparatus 500 receives this confirmation packet from the DHCP server 550, the image forming apparatus 500 may check the IP allocation mode in operation S630 and accordingly refuse to respond to the packet in response to the IP allocation mode corresponding to the previous IP maintenance mode in operation S640. If there is no response from the image forming apparatus 500 after a predetermined time, the DHCP server 550 may read an IP address previously allocated to the image forming apparatus 500 from the server storage unit 560 and may transmit a DHCPOFFER packet to the image forming apparatus 500 to provide the previously allocated IP address to the image forming apparatus 500 in operation S650. Here, the predetermined time may correspond to a timeout period and can be set to a value in a range of about 30 seconds to about 5 minutes according to a network environment. In this manner, the image forming apparatus 500 can continue to use the previous IP address without changing the IP address in the DHCP server environment in which the DHCP discover operation confirms the to-be-allocated IP address from the image forming apparatus 500.

As previously described, the image forming apparatus 500 checks the IP allocation mode in response to receiving the confirmation packet, such as an ICMP/PING/ARP packet, from the DHCP server 550 in operation S630 and responds to the received confirmation packet in response to the IP allocation mode corresponding to a new IP allocation mode in operation S660. In response to the image forming apparatus 500, the DHCP server 550 selects a new IP address and transmits the DHCPOFFER packet to the image forming apparatus 500 to provide the new IP address to the image forming apparatus 500 in operation S670.

When the image forming apparatus 500 receives the packet to confirm whether the image forming apparatus 500 is connected to the network 530 from the DHCP server 550 in operation S620, the image forming apparatus 500 may display information from the received packet to a user by displaying the information using, for example, a panel of the image forming apparatus 500 or a user interface of a host device connected to the image forming apparatus 500.

According to the present general inventive concept, the IP address of the DHCP client, which may undesirably vary according to the IP allocating method and environment of the DHCP server, can be continuously maintained to improve user convenience of the DHCP client such as a network printer.

The present general inventive concept may be applicable to various clients used in a network that distributes IP addresses, such as a network using DHCP to distribute the IP addresses. Furthermore, the present general inventive concept may be useful to client IP allocation that transmits a confirmation packet, such as, for example, a non-standard ICMP/PING/ARP packet, to confirm a DHCP client through a wired/wireless network.

The present inventive concept can also be embodied as computer readable codes on a computer readable recording medium. The computer-readable medium may include a computer-readable recording medium and a computer-readable transmission medium. The computer-readable recording medium may be any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of allocating an IP address of an image forming apparatus using Dynamic Host Configuration Protocol (DHCP), comprising:

requesting a DHCP server to allocate an IP address to an image forming apparatus having a previously allocated IP address wherein the requesting is performed by the image forming apparatus, in response to the image forming apparatus being re-connected to a network;

responding to the IP address allocation request wherein the responding is performed by the DHCP server;

declining to respond to the response of the DHCP server wherein the declining is performed by the image forming apparatus; and providing the previously allocated IP address to the image forming apparatus wherein the providing is performed by the DHCP server, upon receiving no response from the image forming apparatus after a predetermined time.

2. The method of claim 1, wherein the re-connection of the image forming apparatus to the network comprises a power off/on of the image forming apparatus, a network disconnection/re-connection between the image forming apparatus and the DHCP server, or a combination thereof.

3. The method of claim 1, wherein the responding of the DHCP server comprises transmitting a connection confirmation packet in order to determine an IP address to be allocated to the image forming apparatus.

4. The method of claim 3, wherein the connection confirmation packet comprises a non-standard packet.

5. The method of claim 4, wherein the non-standard packet comprises an Address Resolution Protocol (ARP) Broadcast, Internet Control Message Protocol (ICMP), or PING.

6. The method of claim 1, wherein the image forming apparatus stores the IP address provided by the DHCP server as a new IP address.

7. The method of claim 1, further comprising displaying the response of the DHCP server wherein the displaying is performed by the image forming apparatus.

8. The method of claim 7, wherein the response is displayed through a panel of the image forming apparatus or a user interface of a host device connected to the image forming apparatus.

9. The method of claim 1, further comprising inputting an IP allocation mode of determining whether the previously allocated IP address is to be maintained in an IP allocation process using the DHCP server.

10. The method of claim 9, wherein the IP allocation mode comprises a new IP allocation mode of replying to the response of the DHCP server to be allocated a new IP address and a previous IP maintenance mode of declining to respond to the DHCP server to maintain the previously allocated IP address.

11. An image forming apparatus comprising:
a storage unit to store an IP address previously allocated by a Dynamic Host Configuration Protocol (DHCP) server;
a network interface to transmit/receive packets to/from the DHCP server used in IP address allocation through a network; and
a controller to request the DHCP server to allocate an IP address through the network interface in response to the image forming apparatus being re-connected to the network, receive a packet to confirm whether the image forming apparatus is connected to the network from the DHCP server through the network interface, decline to respond to the received packet, receive the previously allocated IP address transmitted from the DHCP server through the network interface and store the received IP address in the storage unit.

12. The image forming apparatus of claim 11, wherein the confirmation of connection of the image forming apparatus to the network is performed using an Address Resolution Protocol (ARP) Broadcast, Internet Control Message Protocol (ICMP), or PING.

13. The image forming apparatus of claim 11, further comprising a user interface to provide an IP allocation mode of selecting whether the previously allocated IP address is to be maintained in an IP allocation process using the DHCP server.

14. The image forming apparatus of claim 13, wherein the IP allocation mode comprises a new IP allocation mode of replying to the response of the DHCP server to be allocated a new IP address and a previous IP maintenance mode of declining to respond to the DHCP server to maintain the previously allocated IP address.

15. The image forming apparatus of claim 11, wherein the re-connection of the image forming apparatus to the network comprises a power off/on of the image forming apparatus, a network disconnection/re-connection between the image forming apparatus and the DHCP server, or a combination thereof.

16. An IP allocation system using Dynamic Host Configuration Protocol (DHCP), comprising:
an image forming apparatus to operate as a DHCP client; and
a network managed by at least one DHCP server;
wherein the at least one DHCP server allocates an IP address to at least one DHCP client comprising the image forming apparatus through the network using DHCP,
the image forming apparatus comprises:
a storage unit to store an IP address previously allocated by the at least one DHCP server,
a network interface to transmit/receive packets to/from the at least one DHCP server used in IP allocation through the network, and
a controller to request the at least one DHCP server to allocate the IP address through the network interface in response to the image forming apparatus being re-connected to the network, receive a packet to confirm whether the image forming apparatus is connected to the network from the at least one DHCP server through the network interface, decline to respond to the received packet, receive the previously allocated IP address transmitted from the at least one DHCP server through the network interface and store the received IP address in the storage unit; and
the at least one DHCP server comprises:
a server storage unit to store a range of IP addresses to be allocated to DHCP clients and a lease list including IP addresses that have been allocated to the DHCP clients and MAC addresses of the DHCP clients, which correspond to the IP addresses,
a server network interface to transmit/receive packets to/from the DHCP clients used in IP allocation through the network, and
a controller to receive the IP address allocation request from the image forming apparatus through the server network interface, transmit the packet to confirm whether the image forming apparatus is connected to the network to the image forming apparatus, read the previously allocated IP address of the image forming apparatus from the server storage unit upon receiving no response from the image forming apparatus to the confirmation packet after a predetermined time and transmit the read previously allocated IP address to the image forming apparatus.

17. The IP allocation system of claim 16, wherein the confirmation of connection of the image forming apparatus to the network is performed using an Address Resolution Protocol (ARP) Broadcast, Internet Control Message Protocol (ICMP), or PING.

18. The IP allocation system of claim 16, wherein the image forming apparatus further comprises a user interface to provide an IP allocation mode of selecting whether the previously allocated IP address is to be maintained in an IP allocation process using the DHCP server.

19. A method of allocating an IP address using Dynamic Host Configuration Protocol (DHCP), the method comprising:
- displaying to a user selectable modes of IP address allocation including maintaining a previously allocated IP address and obtaining a new IP address;
- sending an IP address allocation request from an image forming apparatus to a DHCP server;
- sending a confirmation request from the DHCP server to the image forming apparatus;
- determining whether to decline to respond to the confirmation request according to a selection that the previously allocated IP address is to be maintained;
- declining, by the image forming apparatus, to respond to the confirmation request from the DHCP server so that the previously allocated IP address will be provided to the image forming apparatus; and
- providing the previously allocated IP address to the image forming apparatus by the DHCP server in response to not receiving a response to the confirmation request from the image forming apparatus.

20. The method of claim 19, wherein the IP address allocation request is sent to the DHCP server in response to the image forming apparatus having had an interruption in power, connection, or a combination thereof.

21. The method of claim 19, further comprising:
- providing a new IP address to the image forming apparatus by the DHCP server in response to receiving a response to the confirmation request from the image forming apparatus; and
- determining the previously allocated IP address according to stored data corresponding to information included in the IP address allocation request.

* * * * *

UNITED STATES PATENT AND TRADEMARK OFFICE
CERTIFICATE OF CORRECTION

| | | |
|---|---|---|
| PATENT NO. | : 8,032,616 B2 | Page 1 of 1 |
| APPLICATION NO. | : 12/544397 | |
| DATED | : October 4, 2011 | |
| INVENTOR(S) | : Ju-won Min | |

It is certified that error appears in the above-identified patent and that said Letters Patent is hereby corrected as shown below:

Title Page, please insert;

Section -- (30) Foreign Application Priority Data
September 30, 2008 (KR)...........10-2008-0096213 --

Signed and Sealed this
Nineteenth Day of June, 2012

David J. Kappos
*Director of the United States Patent and Trademark Office*